Patented Aug. 22, 1950

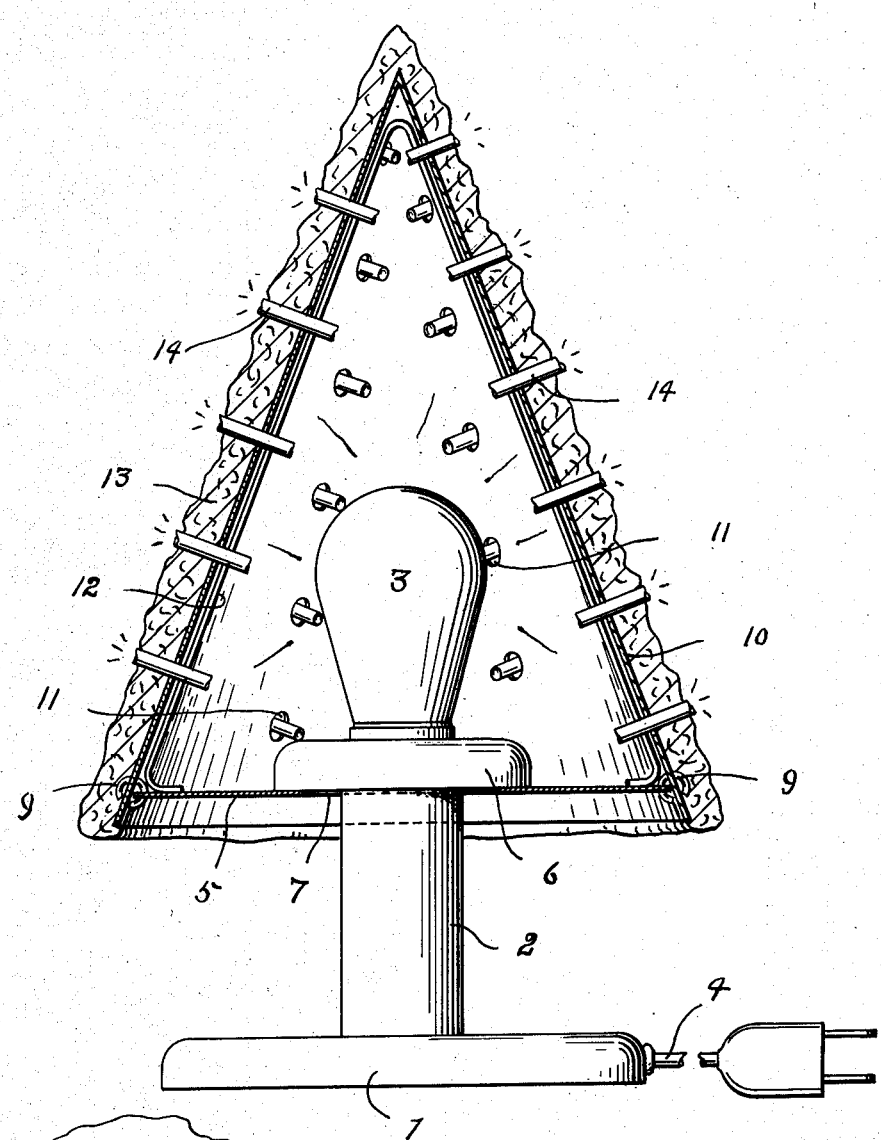

2,519,690

UNITED STATES PATENT OFFICE 2,519,690

ARTIFICIAL CHRISTMAS TREE

Raymond J. Recktenwald, Duluth, Minn.

Application July 10, 1947, Serial No. 759,928

6 Claims. (Cl. 240—10)

This invention relates to ornaments and is particularly adapted to miniature Christmas trees to be used for home decoration or display purposes.

One of the principal objects of the instant invention is to provide lighted decorations in a novel manner which adds materially to the ornamental appeal thereof.

Another object is to suspend the decorations in such a way that portions of the suspending medium itself surrounding the lighted decorations also glow in the same color as the decoration.

Another object is to provide ventilation for the inner area of a Christmas tree embodying the invention whereby the same does not become over heated from the heat dispelled by the light source therewithin.

Another object is to provide a tree of this nature which can be easily assembled by an average individual in his home, the preferred method of marketing being in knocked-down kit form due to the frangible nature of the outer coating of the tree.

Other objects and advantages will appear as the description of the invention proceeds.

Referring now to the accompanying drawing forming a part of this application:

Fig. 1 is a central sectional view of a Christmas tree made in accordance with the invention and showing the light source and pedestal in elevation.

Fig. 2 is a top plan view of the central portion of the cone base.

In the drawing, the reference numeral 1 represents the pedestal for the tree which carries the upright light socket standard 2 and the light bulb 3. An electric cord 4 runs through the pedestal and standard to the socket therein to provide energy for the light bulb 3.

Adjacent the uppermost end of the standard 2 is a circular flat metal cone base 5 which is carried by the inverted cowl-like holder 6 secured to said standard. It is to be noted that the base 5 has a relatively large circular opening 7 centrally thereof and that the cowl-like holder has a series of openings 8 spaced about its upper flat surface, these openings providing for the circulation of air which will aid in keeping the device from overheating.

Carried by the base 5 and secured thereto by a series of ring clips 9 is an asbestos, or other non-combustible, inverted cone-shaped body portion 10 which has a plurality of openings or perforations 11 therethrough which are spaced thereabouts in any desired relation. The cone shaped body portion extends slightly below the base to provide cover therefor so same will not be seen.

If desired, one or more inverted V-shaped wire brackets 12 may be inserted in the core before it is secured to the base to aid in the support of same as well as in maintaining the shape of the cone.

The exterior of the cone 10 of the tree is coated or covered as shown with a thick layer of an airified self-sustaining substance, in the instant case, a foamy soap suds mixture 13 which is made up of a whipped mixture of soap and common clothes starch, the prepared ingredients for which may be purchased at the average five and ten cent store, and which sets after a short period to a frangible but permanent outer coating.

It is well known that colored drinking tubes or so-called soda straws made of cellophane and other similar translucent materials may also be bought at five and ten cent stores. These tubes in a variety of colors are employed to impart colorful jewel-like ornaments for the tree.

The method of applying the colored tubes 14 is deemed novel in that one end of a relatively long piece of tube is pushed through the airified substance 13 approximately centrally of one of the openings 11 in the cone 10 which may be readily distinguished through the substance 13 when the light bulb 3 is illuminated. When the tube 14 is through the mixture and protruding slightly within the cone or body portion 10, the suds or foam which may have collected in the tube 14 as it was being pushed through the mixture may be easily removed by blowing a gentle jet of air through the tube. At this time a scissors or sharp knife may be used to cut the outwardly protruding portion of the tube to its desired length. It is not desirable to have too much of the tube extending outwardly of the airified mixture as this will serve to over decorate the tree. Each of the openings 11 in the cone or body 10 is thus provided with a section of tube 14, and the colors thereof may, of course, be varied as desired without departing from the spirit of the invention.

It is to be noted that the tubes 14 are supported only by the airified substance 13.

A novel feature of the invention is that with the colored tubes 14 in each of the openings 11 and the light 3 illuminated, not only do the tubes themselves glow and radiate in their respective colors, but a portion of the coating substance 13 around each of same also glows in the same color but at a lighter shade than the adjacent tube 14. This is accomplished by the openings 11 being larger than the diameter of the tubes 14, which also allows the tubes to be inserted therethrough without disturbing the foamy airified substance 13 in so doing.

Another novel feature is that good ventilation and cooling means is provided to prevent accidental overheating of the device when illuminated by the fact that the base 10 being open and the tubes 14 being hollow permits of the warmed air to rise naturally and be expelled through the tubes as the cooler air comes naturally into the cone through the holes in the base.

It is deemed apparent that while the invention has been explained from the standpoint of an illuminated tree, the instant tree will also be pleasing and decorative when not so illuminated due to the contrast of the colored tubes with the airified mixture 13, that objects other than a tree might be so decorated and illuminated within the scope of the invention, and that other materials such as spun glass or the like may be utilized for the substance 13.

Having thus described my invention, what I claim is:

1. An artificial Christmas tree comprising a base having a light source installed thereon, a cone-shaped body portion carried by said base in inverted position and having a plurality of perforations therethrough and spaced thereabouts, an airified self-sustaining relatively thick coating covering the exterior of said body portion, and a plurality of translucent tubes extending through said perforations, said tubes being of less diameter than said perforations and being suspended in and by said substance and adapted to transmit light therethrough and therearound.

2. An artificial Christmas tree comprising a base having a light source installed thereon, a cone-shaped body portion supported on said base in inverted position over said light source, said body portion having a plurality of openings therethrough and spaced thereabouts, an airified self-sustaining coating covering the exterior of said body portion, and a tube extending through said coating into each of said openings, said tubes being of less diameter than said openings and being suspended in said coating whereby light may be transmitted from said light source through said openings into said coating between said tubes and the limits of said openings.

3. The method of producing a decorated interiorly lighted artificial tree which comprises installing a perforated cone in inverted position on a base carrying a light source, coating said cone with a whipped mixture of soap and starch, inserting translucent tubes through said mixture and the perforations of said cone while said mixture is wet, removing any of said mixture from within said tubes by a slight jet of air, and subsequently cutting said tubes to the desired length.

4. The combination with an internally lighted miniature Christmas tree having a perforated body portion of cone shape, of an exterior coating of a whipped mixture of soap and starch on said body portion and a plurality of varicolored translucent tubes extending through said coating and the perforations in said body portion, said tubes being suspended in and supported by said coating and being of less diameter than the perforations through which they extend whereby light may be transmitted from said light source through said openings into said coating between said tubes and the limits of said openings.

5. In a miniature artificial tree having a base and an internally lighted cone-shaped perforated body portion, means for decorating said tree comprising: a coating of whipped soap and starch applied to the exterior surface of said body portion, and a plurality of translucent tubes extending through said coating and perforations, said tubes being of less diameter than said perforations and being suspended in said coating whereby light may be transmitted from said light source through said openings into said coating between said tubes and the limits of said openings.

6. In a miniature artificial tree having a base and an internally lighted cone-shaped body portion, the latter having perforations therethrough and spaced thereabouts, means for decorating said tree comprising: a coating of an airified substance applied to the exterior of said body portion, and a plurality of translucent tubes extending through said coating and perforations, said tubes being of less diameter than said perforations and being suspended in said coating whereby light may be transmitted from said light source through said openings into said coating between said tubes and the limits of said openings.

RAYMOND J. RECKTENWALD.

REFERENCES CITED

The following references are of record in the file of this patent:

UNITED STATES PATENTS

| Number | Name | Date |
|---|---|---|
| 1,623,086 | Bock | Apr. 5, 1927 |
| 2,125,906 | Frei, Jr. | Aug. 9, 1938 |
| 2,207,339 | Camp et al. | July 9, 1940 |